United States Patent Office 3,149,956
Patented Sept. 22, 1964

3,149,956
PREPARATION OF GRANULAR NITROGENOUS FERTILIZER
James E. Seymour, Lake Wales, Fla., and Robert White, Atlanta, Ga., assignors to Armour and Company, Chicago, Ill., a corporation of Delaware
No Drawing. Filed Aug. 3, 1961, Ser. No. 128,959
4 Claims. (Cl. 71—29)

This invention relates to the preparation of granular nitrogenous fertilizer, and more particularly to a process for manufacturing granular, homogeneous, nitrogenous fertilizer products from aqueous nitrogenous solutions through the employment of phosphatic slimes and/or a chemical, such as calcium sulfate, for absorbing free moisture as water crystallization to effect drying of the products.

An object of the invention is to provide a new process for the manufacture of granular, homogeneous, nitrogenous fertilizer products. A further object is to provide a process for such manufacture in which phosphatic slimes are utilized to increase the water-holding capacity of the products in soils, while providing some nutrient $P_2O_5$ value and to act as a coating agent to inhibit product caking. A further object is to utilize in such manufacture calcium sulfate, which may be completely or partially calcined, to chemically absorb free moisture as water of crystallization, thus eliminating the necessity of external heat addition to effect drying of the products. A still further object is to provide a process for utilizing the moisture holding capacity, in soils efficacy as a coating agent, and binding properties of phosphatic slimes, as well as binding properties and water absorption properties of calcined calcium sulfate, and to cause granulation of such mixtures in the usual or conventional granulation apparatus by compaction, flaking, agglomeration or particulate disintegration of a semi-plastic mass. Other specific objects and advantages will appear as the specification proceeds.

In one embodiment of the invention, we utilize an aqueous nitrogenous solution, such as, for example, ammonium nitrate liquor, urea liquor, non-polymerized urea-formaldehyde liquor, or combinations thereof. In such aqueous nitrogenous solutions, we incorporate calcium sulfate in such proportion that in the resultant reaction, the product is reduced substantially to dryness and in a granular homogeneous form, thus obviating the need for product drying.

We may incorporate the calcium sulfate into the reaction zone in which case it is disposed within the finished granules or we may incorporate it into the stream following the formation of the granules in which case it forms a coating on the granules. Preferably, we introduce the calcium sulfate, suitably calcined calcium sulfate, both into the reaction zone and subsequently to the formation of granules whereby to place it both within and as a coating upon the granules. In the process we may incorporate phosphatic slimes in the reaction zone so that the slimes add nutrient $P_2O_5$ value, while also serving as a binder. The final gypsum-ammonium nitrate product is highly advantageous for use in saline soil areas where the gypsum carrier has definite advantages over limestone. The gypsum not only contains $P_2O_5$, but is non-acid forming and is not reactive with mono-ammonium phosphate, whereas the limestone is detrimentally reactive.

Instead of incorporating the slimes in the reaction zone, we may add the slimes just after granulation has taken place in which case the slimes form a coating on the granules. Preferably we may add a part of the slimes into the reaction zone and a part after the granules are formed to obtain closely bound granules which also contribute to water holding characteristics of the soil to which the fertilizer is applied.

In the process embodiment described, the phosphatic slimes or gypsum are mixed with the aqueous nitrogenous solutions and with calcium sulfate in a mixer, flaker or prilling tower, and from this reaction zone the product is passed to a cooler and thence to a classifier for packaging of the final product. After the product leaves the cooler, it may be recycled to the reaction zone, the recycling requirements being dependent upon the product particle size and moisture content, the recycle particle size, temperature, composition and moisture content, ambient conditions, reaction mixture composition, and reaction mixture temperature. For example, in the production of a ton of product (16–0–0) and with certain proportions between the nitrogenous solution, calcium sulfate, and slimes, it may be necessary to have recycle rates of 5.0 to 15.0 tons of recycle/ton of product. For another formula or starting material, it may be necessary to have 3 or 4 tons of recycle/ton of product. Other formulae or proportion starting materials may require less than one ton of recycle/ton of product.

We find that we can avoid high liquid phase granulation problems (recycle requisities) by pre-calcining all or a part of the gypsum or slimes used, depending upon the grade produced. Also, we find that the freshly calcined calcium sulfate will contain enough heat to provide adequate liquid phase for granulation and vaporizing the free water necessary to give a good product. Thus, the product drying step may be unnecessary or the requirements therefor greatly reduced.

Specific examples of the process may be set out as follows:

Example I

Three samples of 16–0–0 were produced in the laboratory and these are representative of the —6+16 mesh fractions of each of three batch series made with the following formulae:

| | Pounds of Ingredient per Ton of Product | |
|---|---|---|
| | Product Basis | Formulation Basis |
| SERIES "A" | | |
| 83% $NH_4NO_3$ (liquor) | 930 | 1,120 |
| Calcium Sulfate | 874 | 990 |
| Phosphatic Slimes | 186 | *200 |
| Totals | 1,990 | 2,310 |
| SERIES "B" | | |
| $NH_4NO_3$ (Crystals) | 930 | 930 |
| Calcium Sulfate | 874 | 990 |
| Phosphatic Slimes | 186 | *200 |
| Totals | 1,990 | 2,120 |
| SERIES "C" | | |
| 83% $NH_4NO_3$ (Liquor) | 930 | 1,120 |
| Calcined Calcium Sulfate | 874 | 687 |
| Phosphatic Slimes | 186 | *200 |
| Totals | 1,990 | 2,007 |

*40 lbs./ton used as coating agent.

Granulation of formula "A" will require recycle rates of 5.0–15.0 tons of recycle/ton of product. Formula "B" recycle requisites should be a minimum of 3¾ tons of recycle/ton of product. Formula "C" should require less than 1 ton of recycle/ton of product.

In the above operations, the freshly calcined calcium sulfate contained enough heat to provide adequate liquid phase for granulation, while at the same time vaporizing the free water necessary to give a good product.

*Example II*

A formula (on a ton basis) was prepared as follows:

|  | Pounds of Ingredient per Ton of Product | |
|---|---|---|
|  | Product Basis | Formulation Basis |
| 83% Ammonium Nitrate Liquor | 1,200 | 1,450 |
| Calcium Sulfate (Partially Calcined) | 790 | 621 |
| Moisture | 10 |  |
| Total Weight | 2,000 | 2,071 |

The above represents a formula for 21-0-0. 1.8% by weight of anhydrous gypsum was employed as the coating agent. The 83% ammonium nitrate liquor should be adequately distributed with respect to the solid phase (163° C. gypsum or a combination of 163° C. gypsum and $CaSO_4 \cdot 2H_2O$ and recycle). With proper formulation with respect to hydration, the need for product drying is eliminated. No chemical problems were presented. It was found that corrosion, pollution, and flash fires were avoided.

While in the foregoing specification, we have set forth a description or embodiment of our invention in considerable detail for the purpose of illustrating the invention, it will be understood that such detail or details may be varied widely by those skilled in the art without departing from the spirit of our invention.

We claim:

1. In a process for preparing a nitrogenous fertilizer product, the step of reacting in the absence of external heat an aqueous nitrogenous material selected from the group consisting of ammonium nitrate liquor, urea liquor, non-polymerized urea-formaldehyde liquor, and combinations thereof, with sufficient freshly calcined calcium sulfate to chemically absorb the free water of crystallization and reduce the granulated product substantially to dryness.

2. The process of claim 1 in which phosphatic slimes are incorporated as a binder in the granular product.

3. The process of claim 1 in which phosphatic slimes are calcined and added to the reactants in the reaction zone.

4. In a process for preparing a nitrogenous fertilizer product, the steps of reacting in the absence of external heat an aqueous nitrogenous material selected from the group consisting of ammonium nitrate liquor, urea liquor, non-polymerized urea-formaldehyde liquor, and combinations thereof, in a reaction zone with sufficient freshly calcined calcium sulfate to chemically absorb the free water of crystallization, withdrawing a portion of the reacted product from said zone as a final dried product, and withdrawing another portion of said reacted product equal in weight at least to said first-mentioned portion and recycling the same together with added calcined calcium sulfate and nitrogenous material to the reaction zone.

References Cited in the file of this patent

UNITED STATES PATENTS

| 1,263,363 | Bergve et al. | Apr. 23, 1918 |
| 2,399,987 | Cordie et al. | May 7, 1946 |
| 2,963,358 | White | Dec. 6, 1960 |

FOREIGN PATENTS

| 354,307 | Great Britain | July 31, 1931 |